(12) United States Patent
Henson

(10) Patent No.: US 12,213,202 B2
(45) Date of Patent: Jan. 28, 2025

(54) SYSTEMS AND METHODS FOR DETECTING AND ATTACKING A VPN

(71) Applicant: CACI, Inc.—Federal, Arlington, VA (US)

(72) Inventor: Edward F. Henson, Reston, VA (US)

(73) Assignee: CACI, Inc.—Federal, Reston, VA (US)

( * ) Notice: Subject to any disclaimer, the term of this patent is extended or adjusted under 35 U.S.C. 154(b) by 393 days.

(21) Appl. No.: 17/708,049

(22) Filed: Mar. 30, 2022

(65) Prior Publication Data
US 2023/0254285 A1 Aug. 10, 2023

Related U.S. Application Data

(60) Provisional application No. 63/307,384, filed on Feb. 7, 2022.

(51) Int. Cl.
*H04W 76/20* (2018.01)
*H04L 9/40* (2022.01)
(Continued)

(52) U.S. Cl.
CPC ......... *H04W 76/20* (2018.02); *H04L 41/0686* (2013.01); *H04L 43/04* (2013.01);
(Continued)

(58) Field of Classification Search
CPC ..... H04W 76/20; H04W 12/06; H04W 48/20; H04W 74/0816; H04W 84/12;
(Continued)

(56) References Cited

U.S. PATENT DOCUMENTS 8,856,910 B1 * 10/2014 Rostami-Hesarsorkh ................. H04L 63/1408 713/168
11,677,668 B1 * 6/2023 Urias ...................... H04L 43/18 709/224

(Continued)

OTHER PUBLICATIONS

Deri, L., & Sartiano, D. (Dec. 2020). Monitoring IoT Encrypted Traffic with Deep Packet Inspection and Statistical Analysis. In 2020 15th International Conference for Internet Technology and Secured Transactions (ICITST) (pp. 1-6). IEEE. (Year: 2020).*

(Continued)

*Primary Examiner* — Abiy Getachew
*Assistant Examiner* — Calvin Thanh Nguyen
(74) *Attorney, Agent, or Firm* — BakerHostetler

(57) ABSTRACT

A system may be configured to identify VPN traffic. Some embodiments may: obtain a plurality of default port numbers and/or protocol types; obtain information continually updated to indicate at least one of a predetermined host or DNS; and detect VPN traffic based on a used port number and/or used protocol type, the VPN traffic being generated based on user-interaction at a client device. The detection may be performed by comparing the port number or protocol type against the obtained port numbers or protocol types, the VPN traffic being detected from among a larger set of network traffic. Some embodiments may further: determine that the detected port number or protocol type indicates a higher level of security; filter the larger set of traffic by identifying the detected VPN traffic routed to the predetermined host or DNS; and block or otherwise disrupt the VPN traffic.

20 Claims, 6 Drawing Sheets

(51) Int. Cl.
*H04L 41/0686* (2022.01)
*H04L 43/04* (2022.01)
*H04L 43/16* (2022.01)
*H04W 12/06* (2021.01)
*H04W 48/20* (2009.01)
*H04W 74/0816* (2024.01)
*H04W 84/12* (2009.01)

(52) U.S. Cl.
CPC .......... *H04L 43/16* (2013.01); *H04L 63/0227* (2013.01); *H04L 63/0272* (2013.01); *H04L 63/302* (2013.01); *H04W 12/06* (2013.01); *H04W 48/20* (2013.01); *H04W 74/0816* (2013.01); *H04W 84/12* (2013.01)

(58) Field of Classification Search
CPC ..... H04L 41/0686; H04L 43/04; H04L 43/16; H04L 63/0227; H04L 63/0272; H04L 63/302
See application file for complete search history.

(56) References Cited

U.S. PATENT DOCUMENTS

| | | | | |
|---|---|---|---|---|
| 2010/0142382 | A1* | 6/2010 | Jungck | H04L 63/123 370/242 |
| 2013/0318345 | A1* | 11/2013 | Hengeveld | H04L 45/22 713/168 |
| 2014/0282967 | A1* | 9/2014 | Maguire | H04L 67/125 726/7 |
| 2019/0058730 | A1* | 2/2019 | Fu | H04L 69/16 |
| 2019/0110172 | A1* | 4/2019 | Strong | H04W 76/40 |
| 2019/0268305 | A1* | 8/2019 | Xu | H04L 61/5007 |
| 2020/0084265 | A1* | 3/2020 | Deen | H04L 67/02 |
| 2020/0273040 | A1* | 8/2020 | Novick | G06Q 20/4016 |
| 2020/0296136 | A1* | 9/2020 | Liu | H04L 63/1416 |
| 2020/0314107 | A1* | 10/2020 | Joshi | H04L 63/10 |
| 2022/0103525 | A1* | 3/2022 | Shribman | G06F 16/9574 |
| 2022/0278874 | A1* | 9/2022 | Gabay | H04L 63/0272 |
| 2023/0049690 | A1* | 2/2023 | Ponaka | H04L 12/4641 |
| 2023/0084349 | A1* | 3/2023 | Gabay | H04W 76/10 709/227 |

OTHER PUBLICATIONS

Chaoqun, L., Jie, L., & Bin, D. (Mar. 25-27, 2022). Research on Voip-Over-Vpn s Classification and Mitigation. In 2022 8th International Conference on Information Management (ICIM) (pp. 63-67). IEEE. (Year: 2022).*

L. Deri et al.; "nDPI: Open-source high-speed deep packet inspection"; International Wireless Communications and Mobile Computing Conference (IWCMC); Nicosia; 2014; pp. 617-622.

D. Felsch et al.; "The Dangers of Key Reuse: Practical Attacks on IPsec IKE"; in 27th USENIX Security Symposium Baltimore, MD; 2018; pp. 567-583.

* cited by examiner

*Ethernet

File  Edit  View  Go  Capture  Analyze  Statistics  Telephony  Wireless  Tools  Help Apply a display filter ... <Ctrl-/>                                                                          Expression...

| No.   | Time        | Source          | Destination     | Protocol | Length | Info |
|-------|-------------|-----------------|-----------------|----------|--------|------|
| 76016 | 792.648766  | 10.180.72.1     | 10.180.72.33    | TCP      | 60     | 8013 → 54180 [RST, ACK] Seq=1 Ack=1 Win=0 Len=0 |
| 76017 | 793.251552  | 10.180.72.33    | 239.255.255.250 | SSDP     | 179    | M-SEARCH * HTTP/1.1 |
| 76018 | 793.288488  | 10.180.72.33    | 184.75.234.240  | ISAKMP   | 550    | Aggressive |
| 76019 | 793.305895  | 184.75.234.240  | 10.180.72.33    | ISAKMP   | 578    | Aggressive |
| 76020 | 793.310799  | 10.180.72.33    | 184.75.234.240  | ISAKMP   | 218    | Aggressive |
| 76021 | 793.335139  | 184.75.234.240  | 10.180.72.33    | ISAKMP   | 138    | Transaction (Config Mode) |
| 76022 | 793.335387  | 10.180.72.33    | 184.75.234.240  | ISAKMP   | 154    | Transaction (Config Mode) |
| 76023 | 794.399920  | Cisco_ee:03:11  | Dell_97:70:3e   | ARP      | 60     | Who has 10.180.72.33? Tell 0.0.0.0 |
| 76024 | 794.399943  | Dell_97:70:3e   | Cisco_ee:03:11  | ARP      | 42     | 10.180.72.33 is at 8c:04:ba:97:70:3e |
| 76025 | 795.067269  | 10.180.72.28    | 239.255.255.250 | SSDP     | 179    | M-SEARCH * HTTP/1.1 |

> Frame 76018: 550 bytes on wire (4400 bits), 550 bytes captured (4400 bits) on interface 0
> Ethernet II, Src: Dell_97:70:3e (8c:04:ba:97:70:3e), Cisco_ef:25:c6 (00:45:1d:ef:25:c6)
> Internet Protocol Version 4, Src: 10.180.72.33, Dst: 184.75.234.240
> User Datagram Protocol, Src Port: 500, Dst Port: 500
> Internet Security Association and Key Management Protocol

FIG. 3

| No. | Time | Source | Destination | Protocol | Length | Info |
|---|---|---|---|---|---|---|
| 747... | 786.260212 | 10.201.8.18 | 10.180.72.33 | DNS | 88 | Standard query response 0xb58b A fac.X.com A 10.202.11 |
| 754... | 789.338831 | 10.180.72.33 | 10.201.8.18 | DNS | 87 | Standard query 0xb7e4 A vpn-east.Y.com |
| 754... | 789.344053 | 10.201.8.18 | 10.180.72.33 | DNS | 103 | Standard query response 0xb7e4 A vpnX.com A 174.75.234.240 |
| 759... | 791.093201 | 10.180.72.33 | 10.201.8.18 | DNS | 73 | Standard query 0x5deb A X.com |
| 759... | 791.098262 | 10.201.8.18 | 10.180.72.33 | DNS | 130 | Standard query response 0x5deb A X.com SOA Xa.com |
| 759... | 791.983271 | 10.180.72.33 | 10.201.8.18 | DNS | 87 | Standard query 0x3559 A vpnX.com |
| 759... | 791.988597 | 10.201.8.18 | 10.180.72.33 | DNS | 103 | Standard query response 0x3559 A vpnX.com A 184.73.234.241 |
| 759... | 792.173530 | 10.180.72.33 | 10.201.8.18 | DNS | 82 | Standard query 0xaf82 A client.wns.windows.com |
| 759... | 792.179183 | 10.201.8.18 | 10.180.72.33 | DNS | 188 | Standard query response 0xaf82 A client.wns.windows.com CNAME wns.notify.windows.com.akadns.net CNAME amer... |
| 759... | 796.607132 | 10.180.72.33 | 10.201.8.18 | DNS | 78 | Standard query 0x91ff A XX.com |

> Frame 75486: 87 bytes on wire (696 bits), 87 bytes captured (696 bits) on interface 0
> Ethernet II, Src: Dell_97:70:3e (8c:04:ba:97:70:3e), Dst: Cisco_ef:25:c6 (00:45:1d:ef:25:c6)
> Internet Protocol Version 4, Src: 10.180.72.33, Dst: 10.201.8.18
> User Datagram Protocol, Src Port: 65253, Dst Port: 53
> Domain Name System (query)

FIG. 4

SYSTEMS AND METHODS FOR DETECTING AND ATTACKING A VPN

CROSS-REFERENCE TO RELATED APPLICATIONS

This application claims the benefit of U.S. Provisional Application No. 63/307,384 filed on Feb. 7, 2022 and entitled "Cyber Security Systems and Methods," the content of which is incorporated by reference herein in its entirety.

TECHNICAL FIELD

The present disclosure generally relates to systems and methods for implementing a multi-stage detector of secured network activity. More particularly, traffic on a network may be monitored, an algorithm may determine whether such activity indicates virtual private network (VPN) traffic, and a disruption thereof may be performed.

BACKGROUND

VPNs are known to extend private networks across a public network and enable users to send and receive data as if their computing devices were directly connected to the private network. VPNs often increase functionality, security, management of the private network, and remote access to resources inaccessible on the public network. VPNs are typically created by establishing a virtual point-to-point connection through the use of dedicated circuits or with tunneling protocols over existing networks. VPNs do not make online connections completely anonymous, but they may usually increase privacy and security. To prevent disclosure of private information, VPNs typically allow only authenticated remote access using tunneling protocols and encryption techniques.

User devices (e.g., mobile phones, tablets, laptops, servers, etc.) are increasingly relying on VPN technology to provide privacy and security for their data traffic. Modern implementations make it even easier to apply by providing an always on approach to security. This has led to a marked increase in VPN use in the mobile domain and presents complexities to cyber operations. Once a connection has been established, it may be nearly impossible to detect specific traffic from individual users. External parties only see encrypted traffic transmitted between the user and VPN server; effectively preventing eavesdropping altogether. Additionally, VPN clients often utilize options to block domain name system (DNS) leakage, keeping all traffic contained within the VPN as well. And VPN clients often omit logs on individual users, preventing post analysis on the tunnel endpoint for user traffic correlation.

SUMMARY

Systems and methods are disclosed classifying VPN traffic through a multi-stage process. Accordingly, one or more aspects of the present disclosure relate to a method, comprising: obtaining a plurality of default port numbers and/or protocol types; obtaining information continually updated to indicate at least one of a predetermined host or DNS; and detecting VPN traffic based on a used port number and/or used protocol type, the VPN traffic being generated based on user-interaction at a client device. The detection may be performed by comparing the used port number or protocol type against the obtained port numbers or protocol types, the VPN traffic being detected from among a larger set of network traffic. Some embodiments may further: determine that the detected port number or protocol type indicates a higher level of security; filter the larger set of traffic by identifying the detected VPN traffic routed to the predetermined host or DNS; and block or otherwise disrupt the VPN traffic.

The method is implemented by a system comprising one or more hardware processors configured by machine-readable instructions and/or other components. The system comprises the one or more processors and other components or media, e.g., upon which machine-readable instructions may be executed. Implementations of any of the described techniques and architectures may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

FIG. 3 illustrates an example of a system in which at least one of Internet protocol security (IPSec) or the Internet key exchange (IKE) protocol are identified, in accordance with the prior art.

FIG. 4 illustrates an example of a system in which a VPN DNS is identified, in accordance with one or more embodiments.

DETAILED DESCRIPTION

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

Figure 1:
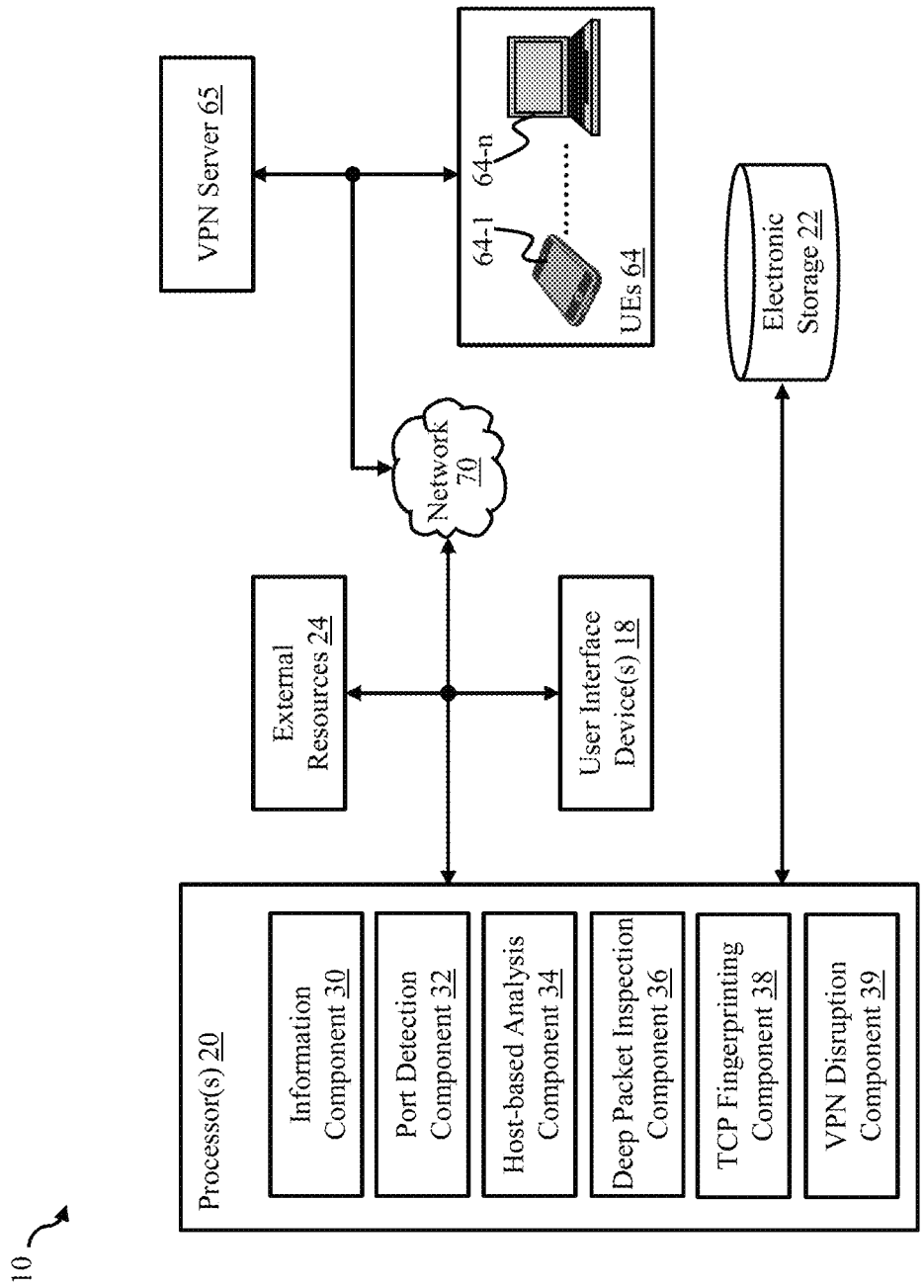
FIG. 1 illustrates an example of a multi-stage, VPN-detection system, in accordance with one or more embodiments.

Presently disclosed are ways of detecting VPN traffic. FIG. 1 exemplarily illustrates system 10 configured to implement an attack vector.

VPN systems may be classified by: a tunneling protocol used to tunnel the traffic, the tunnel's termination point location (e.g., at the edge of a network), a type of topology of connections (e.g., site-to-site or network-to-network), a level of provided security, the OSI layer they present to the connecting network (e.g., layer 2 circuits or layer 3 network connectivity), and a number of simultaneous connections.

Figure 2:
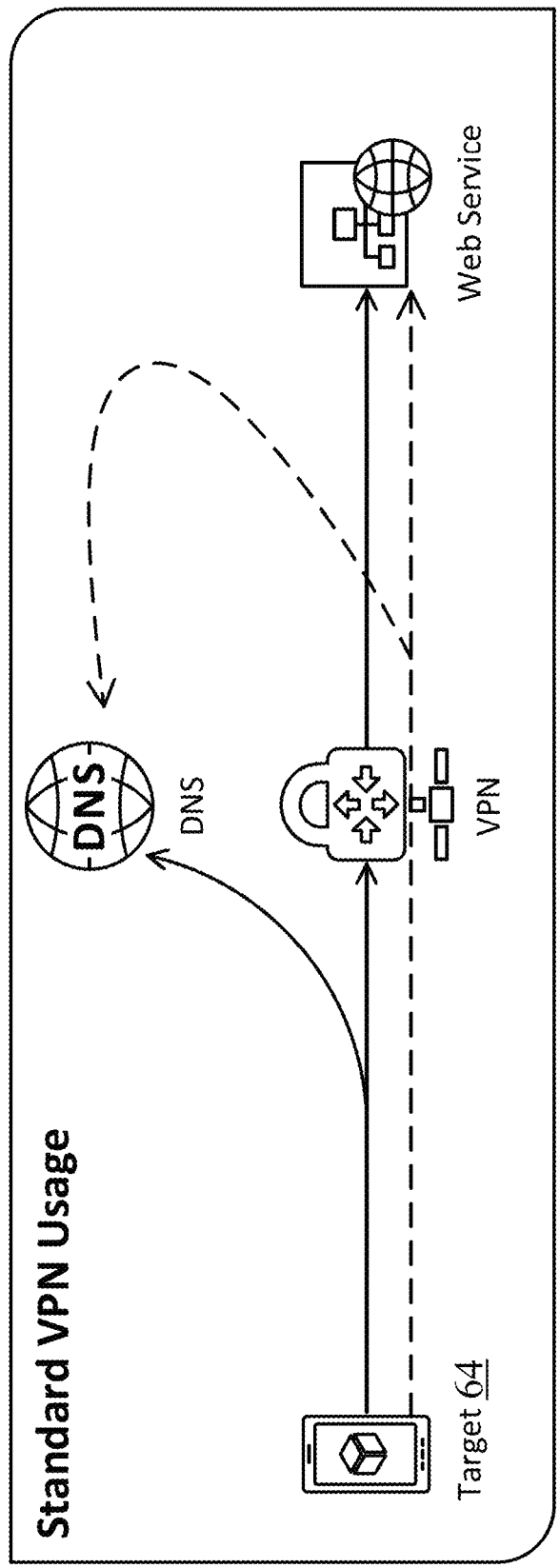
FIG. 2 illustrates a commonly used VPN architecture, in accordance with the prior art.

A common VPN architecture is shown in FIG. 2, including a target (e.g., a set of users and corresponding device(s)), VPN, DNS, and web service. Secure VPN protocols include, e.g., Internet protocol security (IPsec), transport layer security (TLS), secure sockets layer (SSL), datagram transport layer security (DTLS), Microsoft point-to-point encryption (MPPE), Microsoft secure socket tunneling protocol (SSTP) that tunnels point-to-point protocol (PPP) or layer 2 tunneling protocol traffic through an SSL/TLS channel, multi path virtual private network (MPVPN), secure shell (SSH) or OpenSSH, WireGuard, and Internet key exchange volume 2 (IKEv2).

As shown in the known example of FIG. 2, an unencrypted DNS request is shown being transmitted by target 64 out of the VPN encapsulation. More modern setups, though, are known to send DNS requests over TLS.

Attacking the underlying technology is a common response, however influencing and guiding human behavior to the desired outcome may prove more effective. Efforts such as spoofing VPN endpoints or attempting to decrypt the traffic are costly and unlikely to succeed, particularly, given the dizzying speed of technology updates. Instead, interfering with the VPN connection may motivate users to disable their VPN altogether. Mobile users have grown accustomed to and expect high availability of their services. Many are likely to disable their VPN as part of the troubleshooting process if they are unable to access their social media or other types of entertainment. Privacy at times may be less important than functioning software applications (apps).

Technologically hardened adversaries may utilize VPNs to prevent the collection of their data. To defeat this, processor 20 may detect, classify, and/or categorize various types of VPN traffic. This analysis may be implemented via a combination of port targeting, host-based filtering, deep packet inspection (DPI), and TCP fingerprinting functionality to determine the various VPN types. When VPN traffic is detected by this analysis engine, the software application (app) may enable other capabilities, e.g., to enable advanced exploitation and disruption. Updated host lists and fingerprints maybe imported into the software application to keep the engine current on emerging VPN hosting services and technologies.

In some embodiments, at least some functionality of processor 20 may be implemented via artificial intelligence (e.g., one or more machine learning models, such as a neural network).

A contemplated deep learning algorithm may obtain a lot of training data (e.g., comprising network traffic) to optimize training parameters.

Machine learning herein refers to a series of operations to train a machine in order to create a machine which may perform various tasks. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, back-propagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is back-propagated from the neural network backward (that is, from the output layer to the input layer), and the connection weight of each node of each layer of the neural network may be updated according to back-propagation. Change in updated connection weight of each node may be determined according to the learning rate.

Calculation of the neural network for input data and back-propagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy. The learning method may vary according to the feature of data. For example, for the purpose of accurately predicting VPN traffic, learning may be performed using supervised learning rather than unsupervised learning or reinforcement learning.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface (UI) device 18, processor 20, etc.). In some embodiments, electronic storage 22 may be located in a server together with processor 20, in a server that is part of external resources 24, in UI devices 18, and/or in other locations. Electronic storage 22 may comprise a memory controller and one or more of optically readable storage media (e.g., optical disks, etc.), magnetically readable storage media (e.g., magnetic tape, magnetic hard drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 20, information received via UI devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network, electronic storage, equipment related to Wi-Fi technology, equipment related to Bluetooth® technology, data entry devices, a power supply (e.g., battery powered or line-power connected, such as directly to 110 volts AC or indirectly via AC/DC conversion), a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to external resources 24 may be provided by other components or resources included in system 10. Processor 20, external resources 24, UI device 18, electronic storage 22, a network, and/or other components of system 10 may be configured to communicate with each other via wired and/or wireless connections, such as a network (e.g., a local area network (LAN), the Internet, a wide area network (WAN), a radio access network (RAN), a public switched telephone network (PSTN), etc.), cellular technology (e.g., GSM, UMTS, LTE, 5G, etc.), Wi-Fi technology, another wireless communications link (e.g., radio frequency (RF), microwave, infrared (IR), ultraviolet (UV), visible light, cm wave, mm wave, etc.), a base station, and/or other resources.

UI device(s) 18 of system 10 may be configured to provide an interface between one or more users and system 10. UI devices 18 are configured to provide information to and/or receive information from the one or more users. UI devices 18 include a UI and/or other components. The UI may be and/or include a graphical UI configured to present views and/or fields configured to receive entry and/or selection with respect to particular functionality of system 10, and/or provide and/or receive other information. In some embodiments, the UI of UI devices 18 may include a plurality of separate interfaces associated with processors 20 and/or other components of system 10. Examples of interface devices suitable for inclusion in UI device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that UI devices 18 include a removable storage interface. In this example, information may be loaded into UI devices 18 from removable storage (e.g., a smart card, a flash drive, a removable disk) that enables users to customize the implementation of UI devices 18.

In some embodiments, UI devices 18 are configured to provide a UI, processing capabilities, databases, and/or electronic storage to system 10. As such, UI devices 18 may include processors 20, electronic storage 22, external resources 24, and/or other components of system 10. In some embodiments, UI devices 18 are connected to a network (e.g., the Internet). In some embodiments, UI devices 18 do not include processor 20, electronic storage 22, external resources 24, and/or other components of system 10, but instead communicate with these components via dedicated lines, a bus, a switch, network, or other communication means. The communication may be wireless or wired. In some embodiments, UI devices 18 are laptops, desktop computers, smartphones, tablet computers, and/or other UI devices.

Data and content may be exchanged between the various components of the system 10 through a communication interface and communication paths using any one of a number of communications protocols. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol version 4 (IPv4) and Internet Protocol version 6 (IPv6).

In some embodiments, processor(s) 20 may form part (e.g., in a same or separate housing) of a user device, a consumer electronics device, a mobile phone, a smartphone, a personal data assistant, a digital tablet/pad computer, a wearable device (e.g., watch), augmented reality (AR) goggles, virtual reality (VR) goggles, a reflective display, a personal computer, a laptop computer, a notebook computer, a work station, a server, a high performance computer (HPC), a vehicle (e.g., embedded computer, such as in a dashboard or in front of a seated occupant of a car or plane), a game or entertainment system, a set-top-box, a monitor, a television (TV), a panel, a space craft, or any other device. In some embodiments, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, UI devices 18, devices that are part of external resources 24, electronic storage 22, and/or other devices).

As shown in FIG. 1, processor 20 is configured via machine-readable instructions to execute one or more computer program components. The computer program components may comprise one or more of port detection component 32, host-based analysis component 34, DPI component 36, TCP fingerprinting component 38, VPN disruption component 39, and/or other components. Processor 20 may be configured to execute components 30, 32, 34, 36, 38, and/or 39 by: software; hardware; firmware; some combination of software, hardware, and/or firmware; and/or other mechanisms for configuring processing capabilities on processor 20.

It should be appreciated that although components 30, 32, 34, 36, and 38-39 are illustrated in FIG. 1 as being co-located within a single processing unit, in embodiments in which processor 20 comprises multiple processing units, one or more of components 30, 32, 34, 36, 38, and/or 39 may be located remotely from the other components. For example, in some embodiments, each of processor components 30, 32, 34, 36, and 38-39 may comprise a separate and distinct set of processors. The description of the functionality provided by the different components 30, 32, 34, 36, 38, and/or 39 described below is for illustrative purposes, and is not intended to be limiting, as any of components 30, 32, 34, 36, 38, and/or 39 may provide more or less functionality than is described. For example, one or more of components 30, 32, 34, 36, 38, and/or 39 may be eliminated, and some or all of its functionality may be provided by other components 30, 32, 34, 36, 38, and/or 39. As another example, processor 20 may be configured to execute one or more additional components that may perform some or all of the functionality attributed below to one of components 30, 32, 34, 36, 38, and/or 39.

The herein-disclosed approach involves one or more VPN blocking capabilities to encourage users to disable their VPN and to enable an array of concepts of operation (CONOPs). For example, port detection component 32 may detect, classify, and/or categorize various types of VPN traffic, and VPN disruption component 39 may provide one or more mechanisms for dropping packets.

In some embodiments, port detection component 32, host-based analysis component 34, deep packet inspection (DPI) component 36, and/or transmission control protocol (TCP) fingerprinting component 38 may accurately discriminate VPN traffic from other traffic (e.g., data encrypted via hypertext transfer protocol secure (HTTPS)). As such, a user associated with generating the VPN traffic may be led to conclude that their VPN is the problem versus their very connection to the Internet, e.g., responsive to the VPN traffic being disrupted. In addition, the herein-disclosed approach may allow for operator-configurable actions to automatically drop VPN traffic and/or to present an array of manual actions. The latter may serve to tailor actions specific to perceived user security postures, which may serve to fuel high suspicion if VPN services are interrupted.

In some embodiments, a targeted approach implemented by one or more components of processor 20 may assist in unmasking traffic for passive monitoring. For example, a plugin (e.g., including functionality of one or more components of processors 20) may be used to classify traffic for the intended device(s) and to drop all VPN traffic (e.g., associated with one or more users of a network). If the user(s) disable their VPN, they may be released back to their original network, allowing traffic to be passively monitored by one or more components of processor 20. In another example, this or another plugin may be applied in an indiscriminate manner, which may allow for mass VPN denial. That is, different from an embodiment that indirectly causes only one or more user equipment (UE) 64 to turn off their VPN, another embodiment may disrupt VPN traffic of all devices detected to use a VPN.

In another contemplated example of a targeted approach, a plugin (e.g., including functionality of one or more components of processors 20) may be used for analysis and characterization. For example, instead of dropping VPN traffic, the plugin may alert the presence and destination of VPN traffic. This may assist in development of target 64 (e.g., where they are, what they are suspected of doing and why, etc.) and may serve to characterize the demographics of an area of interest (AOI) in which the target user is suspected of being. For example, a nationality not commonly found in a specific area may be identified. In this or another example, information component 30 may generate information characteristic of at least one of (i) a target device or user or (ii) the AOI.

As used herein, UE 64 may comprise a plurality of user devices, at least one of which being a target that uses a VPN. In an implementation, target 64 may be on a VPN, and upon not being able to access a website, a user thereof may disable their VPN. If all of a sudden access to that website is available again, they may start using their VPN, while there may be other services that are not being covered within the VPN.

Accordingly, VPN disruption component 39 may not drop all traffic, rather only VPN-related traffic. But if a user of target 64 has a VPN up, which is black-holed, then all traffic may be going through the VPN. Component 39 may thus prompt the user to turn off that VPN. This or another component of processor 20 may then determine that the user disabled the VPN.

In some embodiments, component 39 implementing at least the disruption may be provided at least temporarily in a man-in-the-middle (MitM) configuration such that an original network provider (e.g., access point or cellular network) is replaced. And, responsive to the determination of the disablement, device 64 of the user may be released from the MitM configuration such that the device returns to using the original network provider. For example, nefarious device 64 may be targeted for monitoring, but they may be running a VPN. A contemplated approach thus involves having target 64 connect to processor 20 such that the VPN is defeated or disrupted until a user of the target turns the VPN off, allowing the target to go back to their original network provider but without traffic therefrom being encrypted.

A herein-contemplated approach may involve determining whether there is VPN traffic and what kind of VPN traffic there is. For example, processor 20 may characterize a region in which target 64 is in and, if other devices in that region do not frequently use VPNs, sudden use of a VPN may be indicative of an adversary. In another example, VPNs that connect to a particular host (e.g., a host at a .com uniform resource identifier (URI) as opposed to a host at a .cn URI) may be identified. For example, the herein-disclosed analysis and characterization may provide indications and warnings (I&W) to the operator of system 10 in cases where a VPN endpoint has been associated with a specific (e.g., nefarious) group.

In some embodiments, information component 30 or another component of processor 20 may be configured to determine a VPN endpoint associated with a predetermined group and to provide at least one I&W to an operator of a computer that comprises processor 20. In these other embodiments, contemplated means for detecting VPN traffic may comprise determining that a VPN server is located in a different region (e.g., state, province, country, or another area) from a region in which the computer is.

Figure 5:
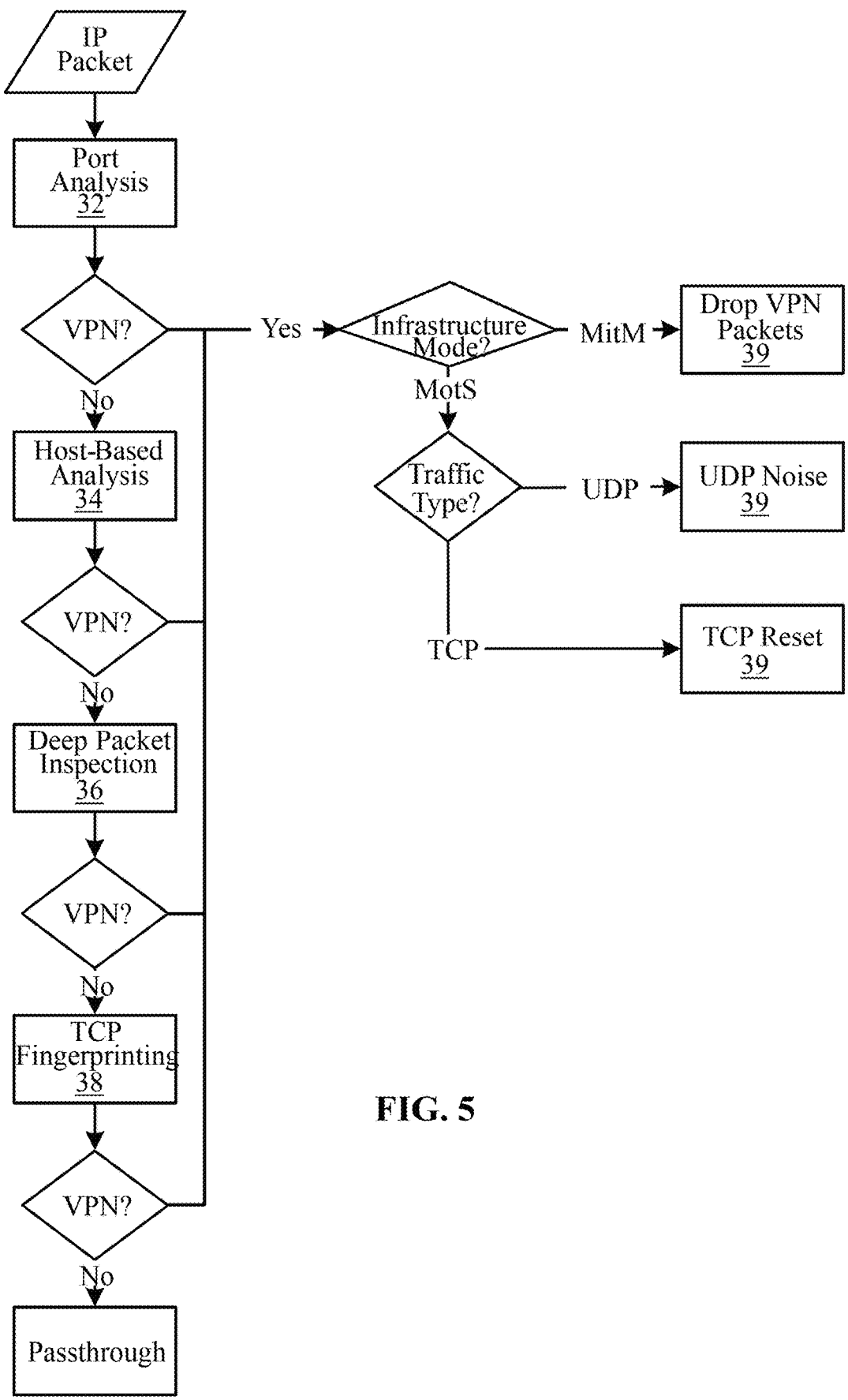
FIG. 5 illustrates an example of a VPN detection system, in accordance with one or more embodiments.

In some embodiments, information component 30 may obtain one or more different parameters (e.g., implementation options) for each of a plurality of different VPN standards. Accordingly, port detection component 32, host-based analysis component 34, DPI component 36, and TCP fingerprinting component 38 may form a multi-stage approach for traffic characterization, as depicted in the example of FIG. 5. For example, traffic may be analyzed through several passes that support less intensive measures (e.g., to detect simple VPN types) and also more complex VPN connections (e.g., hiding within common Internet traffic).

In other words, different aspects of obtained traffic may be progressively inspected. For example, if a used port does not clearly indicate use of a VPN, then a used host may be inspected; if that host name does not clearly indicate use of the VPN. Similarly, as shown in FIG. 5, DPI and TCP fingerprinting functionality may be conditionally performed, e.g., to minimize consumption of computer resource. If none of the contemplated stages indicate use of the VPN, processor 20 may allow the obtained traffic to pass through the network. But if any of the contemplated stages indicate use of the VPN, processor 20 may first identify a used infrastructure mode to then tailor a specific form of VPN disruption, as is also shown in the example of FIG. 5.

The herein-contemplated, multi-stage approach to VPN analysis may comprise one or more of the following phases: port targeting, host/DNS-based filtering, DPI, or TCP fingerprints. Although FIG. 5 depicts the stages in a particular order (e.g., if previous ones fail to confidently detect VPN traffic, a next stage in the depicted sequence is executed), the order in which those operations are illustrated is not limiting. For example, any sequential combination of those four stages is contemplated herein. In some implementations, the steps of the herein-contemplated VPN detection process may be in an order determined based on increasing computational intensity of the steps, increasing adeptness, complexity, and/or advancement of cyber security used by target 64 to perform the respective step, an amount of time needed to perform said steps, and/or another suitable strategy.

DNS is the hierarchical and decentralized naming system used to identify and/or help locate computers, services, and other resources reachable through the Internet or other IP networks. The resource records contained in the DNS translate between domain names (e.g., www.example.com) with other forms of information (e.g., 93.184.216.34, which is an IPv4 address, and/or 2606:2800:220:1:248:1893:25c8:1946, which is an IPv6 address).

In some embodiments, port detection component 32 may inspect field headers of a set of PDUs obtained by information component 30 traversing network 70 to identify port numbers. This operation may require only a small amount of computational cycles. In these or other embodiments, component 32 may be configured to identify a higher level of security used with target 64 due to a detected port number being shared with other HTTPS traffic.

In some embodiments, a computer (e.g., processor 20) implementing a herein-contemplated approach may form part of a device consuming a small amount of size, weight, and power (SWaP). For example, since this computer may have a small form factor (e.g., comprising one or more ARM central processing units CPUs or low-power x86 CPU(s)), only a subset of the herein-disclosed stages may be determined to be needed to detect the VPN traffic as such. Indeed, this computer's resources may further be tasked with running other applications, leaving it with limited resources. As a result, even though the contemplated approach may become more rigorous (e.g., while proceeding through the steps depicted in FIG. 5), such rigor may be determined based on the cyber security used for establishing target 64's VPN.

In some embodiments, port detection component 32 may implement port targeting. For example, this functionality may be performed in an initial stage, e.g., to categorize VPN traffic, from among a larger set of traffic, based on default ports and/or protocol types. In this or another example, when the port number or protocol type match default one(s), detection component 32 may begin the identification of certain traffic as VPN traffic. As such, filtering of multiple VPN types or standards may be substantially quick, e.g., with very little processing overhead. Traditional VPN types typically use default implementations, enabling component 32 to easily detect them. That is, the port and/or protocol type may be detected via initial packet dissection. Some examples of known VPN standards are shown in Table 1.

TABLE 1

VPN Classification

| VPN Type | Ports | Description | Prevalence |
| --- | --- | --- | --- |
| PPTP | TCP 1723<br>Protocol 47 (GRE) | Point-to-Point Tunneling Protocol is a legacy tunneling protocol that uses GRE to encapsulate PPP packets. | Legacy |
| L2TP | UDP 1701 | Layer 2 Tunneling Protocol is an update to PPTP that is used primarily for tunneling PPP over UDP. L2TP does not provide encryption and is often implemented with IPSec. | Legacy |
| IPSec | UDP 500<br>UDP 4500<br>Protocol 50 (ESP) | Protocol suite that is used to establish secure channels through the encapsulating security payload (ESP). | Some |
| IKEv2 | Uses IPSec | Internet Key Exchange v2 is part of the IPSec suite. IKEv2 performs mutual authentication and security association. | Some |
| SSL/TLS | TCP 443 | Class of VPNs that use SSL/TLS protocols to encrypt traffic at the application layer; may be implemented in the browser without requiring specific software. | Common |
| TOR | TCP 80<br>TCP 9001<br>TCP 9030 | TOR uses the concept of onion routing to anonymize traffic. Although not a VPN, TOR is similar in that it obfuscates traffic. | Hardened Adversaries |
| Wireguard | UDP 51820 | New VPN protocol that utilizes a symmetrical key handshake to secure the connection. Due to its lightweight nature and high performance, Wireguard is quickly being adopted. | Emerging |
| OpenVPN | TCP/UDP 1194 | A feature rich VPN that utilizes SSL/TLS to secure connections over either TCP or UDP. Due to its security, OpenVPN has become widely used. | Common |
| DNS Tunneling | UDP/TCP 53 | Tunneling methodology that encapsulates IP packets within DNS requests. Although slow, it is able to bypass many VPN filters. | Hardened Adversaries |

In some implementations, each of SSL VPNs and DNS tunneling may be more difficult to thwart. For example, these implementations may utilize protocols traditionally used for common Internet protocol (IP) traffic, such as HTTPS traffic and traffic involving a DNS. As such, these types of VPN traffic may not be detected during this stage, them being predominantly used for non-VPN traffic.

FIG. 3 depicts IKE handshaking for the establishment of an IPSec VPN session, in accordance with the prior art. In some embodiments, port detection component 32 may identify VPN traffic, e.g., via detecting traffic on user datagram protocol (UDP) port 500. If these packets are dropped, the IPSec VPN may fail to establish.

In some embodiments, VPN disruption component 39 in a MitM configuration may drop one or more PDUs involved in the IKE handshaking so that it does not complete. In other embodiments, another component of processor 20 may obtain one or more PDUs of the IKE handshaking to at least identify that a VPN is being established. As such, a contemplated approach is to disrupt establishment of a VPN, and another approach may be to disrupt the VPN even after it has been established.

As shown in FIG. 3, Internet security association and key management protocol (ISAKMP) is one of a plurality of known VPN types.

FIG. 4 demonstrates an example in which a DNS query for a VPN server is detected by host-based analysis component 34. If the query is dropped, the VPN client may not know the associated IP address for its destined service. Thus, the client may be unable to establish a connection.

As shown in FIG. 1, target 64 may be a client device, and there may also be VPN server 65, which is often known as the aggregator to which the target connects. A DNS may be used to assign a fully qualified domain name to represent VPN server 65. Accordingly, information component 30 may maintain (e.g., at storage 22) a list of all known host names of VPN providers. Upon host-based analysis component 34 determining that there is a match between a PDU directed to one of the known VPN providers, the VPN traffic may be detected.

In some embodiments, component 32 may perform detection, at an initial level of intensity, e.g., including analysis of port numbers and/or VPN protocols of the IP traffic. In these or other embodiments, when information component 30 obtains traffic using port 443, which may be the same port used for SSL-based VPNs and HTTPS traffic, one or more other detection stages comprising a higher level of intensity may be executed. For example, a web-based or SSL-based VPN may result in VPN traffic that is indistinguishable (port-wise or protocol-wise) from HTTPS traffic, enabling a determination that one or more of host-based analysis component 34, DPI component 36, or TCP fingerprinting component 38 are needed to detect the VPN traffic.

Many VPNs leverage connections to persistent VPN servers, which may often be attributable to a particular (e.g., dedicated) provider. In some embodiments, host-based analysis component 34 may implement DNS targeting. For example, IP traffic may be classified as VPN traffic, upon being identified as being routed to a VPN server IP address or hostname known to be associated with the particular provider. In some embodiments, information component 30 may maintain a table or list of VPN server IP addresses and hosts known to be previously used, and this component or another component of system 10 may have the infrastructure to continuously update that table or list.

In some implementations, in corporate VPN connections, a host/IP address may be shared with other web services. For example, Google may host their VPN server at www.google.com/vpn. In this case, a filter of the host www.google.com may block other traffic of other web services that are located on that URI as well. However, by VPN disruption component 39 blocking all of www.NordVPN.com, a more effective approach may be implemented. For example, if a URI is only used for VPN services, then host-based analysis component 34 may determine that component 39 may disrupt traffic purely based upon that URI or DNS name.

In some embodiments, DPI component 36 may inspect substantially all aspects or other details of a protocol data unit (PDU) sent over a computer network. For example, in implementations where port based and/or host-based detection fail to detect (or confidently confirm) VPN traffic, DPI component 36 may identify, inspect, and/or filter the VPN traffic notwithstanding use of a more complex and/or advanced technological implementation. In typical IP routing, network equipment only performs inspection at one or two relevant layers of the IP stack (e.g., by inspecting a header and/or payload of the PDU). In these or other embodiments, DPI component 36 may analyze PDU aspects all the way up to the app layer (e.g., layer 6 or 7) to identify additional details (e.g., use of a predetermined framing, packet length, size, metadata, routing information, and/or attribute of the traffic).

DPI component 36 may thus process the entire contents of the PDU, rather than merely information needed to forward the PDU. In some embodiments, DPI component 36 may determine what app is being used in certain traffic. In these or other embodiments, DPI component 36 may determine one or more differences of between standard traffic and traffic encrypted by a VPN (e.g., by an SSL-based VPN, such as Wireguard). For example, a shape or another attribute of the traffic may be detected to be different from normal traffic.

In some embodiments, DPI component 36 may perform inspection of PDUs to baseline app behavior, analyze network usage, troubleshoot network performance, ensure that data is in the correct format, check for malicious code, eavesdropping, Internet censorship, and/or another set of functionality.

In some embodiments, information component 30 may obtain PDUs for DPI (e.g., via port mirroring, physical insertion of a network tap which duplicates and sends the data stream to an analyzer tool for inspection, or another approach). And DPI component 36 may be used for enterprise level (e.g., corporations and larger institutions) traffic, telecommunications service providers (e.g., Internet service providers (ISPs) or other network providers), governments, and/or in another implementation.

In some embodiments, DPI component 36 may analyze at least one of a packet header, payload, or protocol field. In these or other embodiments, DPI component 36 may analyze app layer metadata and/or packet lengths (e.g., to identify usage patterns and unique identifiers, such as a global unique identifier).

TCP headers have a significant number of fields. In some embodiments, component 38 may implement TCP fingerprinting. For example, one or more combinations or permutations of those fields may be unique enough to determine VPN providers or common VPN apps. In this or another example, the window size and the permutation of accepted cypher algorithms of the VPN server of WireGuard may be unique enough to be reliably and consistently detected. In another example, TCP fingerprinting component 38 may identify VPN traffic through maximum transmission unit (MTU) sizes, e.g., that are less than the operating system standard of 1500 bytes.

In some embodiments, VPN disruption component 39 may take one or more actions, including alerting, blocking, re-routing, or logging. In some embodiments, VPN disruption component 39 may disrupt VPN traffic of just target 64. In these or other embodiments, all VPN traffic detected to be traversing a network via a MitM or man-on-the-side (MotS) configuration may be disrupted by this component.

VPN traffic traversing network 70 may be generated based on one or more interactions (e.g., at a software application) at client device 64. In some embodiments, upon port detection component 32, host-based analysis component 34, DPI component 36, and/or TCP fingerprinting component 38 being used to detect or classify VPN traffic, the VPN traffic may be disrupted (e.g., based on a manner in which IP traffic of network 70 is obtained). For example, processor 20 may be associated with one or more systems (e.g., temporarily) implementing cellular service and/or providing an access point, to UE 64. In this or another example, VPN disruption component 39 may drop the VPN traffic (e.g., by not routing any of its PDUs, within an IP subsystem).

In another example, one or more components of processor 20 may passively detect or observe packets (e.g., in transit over the air (OTA)), and VPN disruption component 39 may drop the VPN traffic (e.g., by transmitting a TCP reset, if the traffic determined to be VPN traffic is TCP-based, or by transmitting UDP noise, if that traffic is determined to be UDP-based). The UDP noise may comprise, e.g., null, garbage, or random data in PDUs transmitted based on a tailoring towards a protocol with which the UDP socket for the VPN is disrupted, causing a connection thereof to drop.

In some embodiments, VPN disruption component 39 may implement one or more cyber disruption capabilities (e.g., precise denial). For example, specific services may be shut down without alerting target 64 of complete communications disruption. This may also help influence targets to take specific actions that better enable collection or exploitation. In some implementations, component 39 may utilize a TCP-based attack to disrupt desired services through leveraging of the TCP state machine. For example, after identifying the use of a particular protocol, at least one TCP reset (RST) may be used to close the connection. Utilizing TCP resets against a service wildcard may disrupt nearly all target communications. This has the benefit over traditional software application Wi-Fi deauthentication effects, as it does not alert the target with changing Wi-Fi status indicators.

In some embodiments, VPN disruption component 39 may implement one or more UDP noise attacks, e.g., which overwhelm receiving services with garbage data. Once component(s) of processor 20 detect the presence of a service, the operator of system 10 or component 39 itself may be able to target the specific UDP service, resulting in disruption in service. The garbage UDP data takes advantage of many applications' network implementations. The attack may also be utilized in a more surgical manner, tailoring it to the particular UDP service. For example, voice-over-IP (VoIP) communication may be disrupted through attacking the balance of RTP control protocol (RTCP) streams.

In some embodiments, when VPN usage is detected, VPN disruption component 39 may disrupt the VPN connection through multiple means. For example, if processor 20 is not in a man-in-the-middle (MitM) role, the connection may be disrupted through TCP resets or UDP noise attacks based on the VPN type. In another example, if target 64 is associated with processor 20 through the MitM setup (e.g., in which a component of processor 20 or associated with processor 20 controls the network connections), VPN packets may be dropped, effectively disabling the VPN connection. This disruption may encourage hardened adversaries to disable their VPN connection. Once the presence of VPN traffic is no longer detected from the target client, information component 30 may alert the operator.

In some embodiments, a computer (e.g., processor 20) implementing a herein-contemplated approach may be provided in a MitM or MotS configuration. For example, this computer may play a role in implementing network 70 (e.g., as networking hardware that allows UE 64 to connect to networking service(s)), or it may snoop (e.g., traffic broadcasted over) network 70. In this or another example, processor 20 may be mounted in relation to a cell tower that obtains incoming network traffic. While having control of that full traffic flow, one or more of the detected VPN PDUs may be dropped by VPN disruption component 39 not forwarding the PDU(s) to go out the gateway interface. Other traffic, though, may be allowed to continue passing therethrough.

In some embodiments, information component 30 may passively obtain network traffic transmitted OTA, e.g., when component 30 is inserted into a MotS configuration. This component may further obtain at least one of a plurality of default port numbers or a plurality of protocol types, and it may iteratively obtain current information indicative of at least one predetermined host or DNS. In these or other embodiments, port detection component 32 may detect VPN traffic based on at least one of a used port number or protocol type. This detection may be performed, e.g., by comparing the at least one port number or protocol type against at least one of the obtained port numbers or the obtained protocol types. These operations of a computer configured as a MotS may be the same for TCP-based and UDP-based VPNs.

Next, use of a TCP-based VPN may be identified from among the obtained OTA traffic. Then, VPN disruption component 39 may continually transmit TCP resets on a connection or link, e.g., until the TCP client (e.g., of target 64) resets the connection or link. The connection or link supporting the VPN traffic may subsequently be detected as being dropped, while other IP traffic may continue to traverse network 70.

In some embodiments, presence of a DNS request to a known host may be detected, from among obtained network traffic. Before a DNS resolver responds to the DNS request, VPN disruption component 39 may insert another response that causes the client device to communicate with a different server.

Alternatively, upon detecting a used port number or protocol type, use of a UDP-based VPN (e.g., a WireGuard implementation or an implementation using DNS tunneling) may be detected from among obtained OTA traffic. Then, specifically framed UDP PDUs (e.g., comprising null data) may be transmitted to the other end of a UDP socket such that the socket is reset or otherwise disrupted and a connection is dropped. For example, UDP noise may disrupt a UDP socket's ability to process that information, causing the connection to be closed. In this or another example, a contemplated attack may comprise disrupting a connection setup by dropping VPN handshaking packets. In one of these examples or in another example, layer 2 tunneling protocol (L2TP) packets may be sent, e.g., with incorrect sequence numbers in the L2TP header and random payloads. In another example, multiple WireGuard handshakes with random keying may be initiated to exhaust the MAX. QUEUED INCOMING HANDSHAKES to trigger an under-load condition.

In some implementations, traffic comprising DNS over HTTPS (DoH) may be obtained at information component 30. DoH is an emerging protocol that utilizes HTTPS to encrypt data between a client and a DNS resolver. For example, browsers and potentially VPN clients may implement DoH. As a result, DNS data may no longer be analyzed or manipulated. Accordingly, one or more components of processor 20 may implement a higher level of cyber exploitation, including imitating legitimate VPN services for MitM decryption purposes (e.g., by component 39 responding to an obtained DNS request with its own response to a different web server). Since DNS analysis is required for the host-based analysis stage of FIG. 5, a contemplated DoH plugin may utilize a blacklist of DNS resolver IP addresses implementing DoH and may drop queries intended for those servers. Web browsers may then revert back to standard DNS requests, allowing for analysis and manipulation as disclosed above.

In some embodiments, VPN disruption component 39 may block DOH using a list of usable servers. For example, information component 30 may obtain a TLS packet destined to an IP address of one of those servers, and component 39 may implement DNS poisoning by not allowing a forwarding out of that packet; as a result, a source of that TLS packet may revert to transmitting an unencrypted DNS request.

In some embodiments, one or more components of processor 20 may implement VPN spoofing. That is, vulnerabilities within IKE may allow for targeting the handshake to retrieve session keys, leading to decrypting the connection. As a result, spoofing of the intended VPN server and/or of the MitM of the connection. This capability targets phase 1 of IKE, which establishes the keying material between the two nodes. RSA vulnerabilities exist for IKEv1 phase 1 implementations, which allows decryption of the nonces. Additionally, some IPSec providers utilize publicly available shared keys. In some embodiments, one or more components of processor 20 may allow for offline dictionary attacks against the pre-shared key (PSK) of IKEv2.

Figure 6:
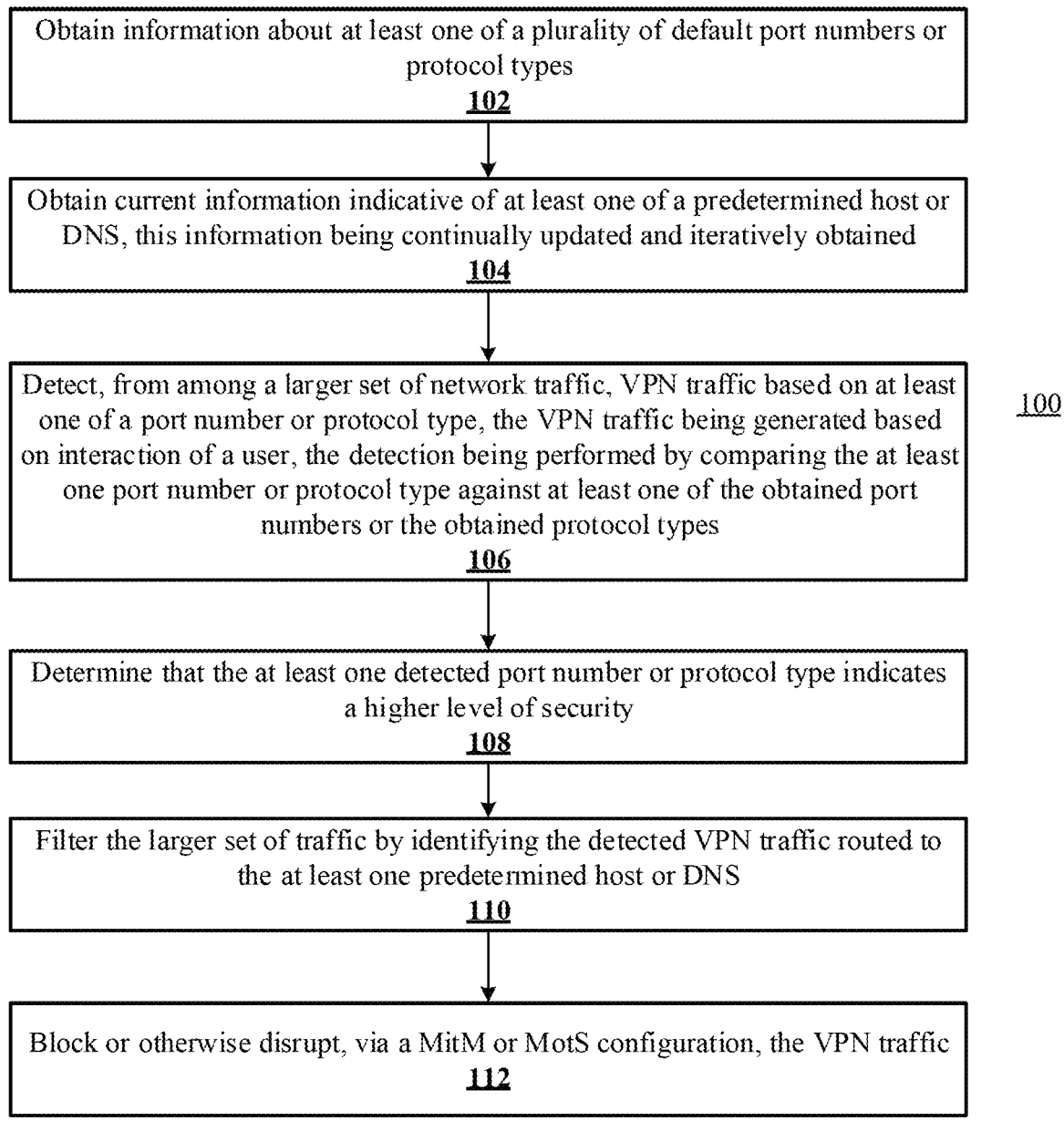
FIG. 6 illustrates a process for detecting VPN traffic, in accordance with one or more embodiments.

FIG. 6 illustrates method 100 for implementing or countering cyber security. Method 100 may be performed with a computer system comprising one or more computer processors and/or other components. The processors are configured by machine readable instructions to execute computer program components. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 6 and described below is not intended to be limiting. In some embodiments, method 100 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 100 in response to instructions stored electronically on an electronic storage medium. The processing devices may include one or more devices configured through hardware, firmware, and/or software to be specifically designed for execution of one or more of the operations of method 100.

At operation 102 of method 100, information about at least one of a plurality of default port numbers or protocol types may be obtained. In some embodiments, operation 102 is performed by a processor component the same as or similar to information component 30 (shown in FIG. 1 and described herein).

At operation 104 of method 100, information indicative of at least one of a predetermined host or DNS may be iteratively obtained, this information being continually kept updated. In some embodiments, operation 104 is performed by a processor component the same as or similar to information component 30 (shown in FIG. 1 and described herein).

At operation 106 of method 100, VPN traffic may be detected, from among a larger set of network traffic, based on at least one of a port number or protocol type, the VPN traffic being generated based on interaction of a user, the detection being performed by comparing the at least one port number or protocol type against at least one of the obtained port numbers or the obtained protocol types. In some embodiments, operation 106 is performed by a processor component the same as or similar to port detection component 32 (shown in FIG. 1 and described herein).

At operation 108 of method 100, the at least one detected port number or protocol type may be determined to indicate a higher level of security. In some embodiments, operation 108 is performed by a processor component the same as or similar to port detection component 32 (shown in FIG. 1 and described herein).

At operation 110 of method 100, the larger set of traffic may be filtered by identifying the detected VPN traffic routed to the at least one predetermined host or DNS. In some embodiments, operation 110 is performed by a processor component the same as or similar to host-based analysis component 34 (shown in FIG. 1 and described herein).

At operation 112 of method 100, the VPN traffic may be blocked or otherwise disrupted, via a MitM or MotS configuration. As an example, VPN traffic may be disrupted without disrupting any of other traffic traversing a shared access point, antenna, or other network provider. As a result, a user of target 64 may be encouraged to disable use of their VPN (e.g., which may result in obtainment of plaintext data). A user that can thus no longer access (e.g., social media) online content, may be led to disable their VPN, e.g., with access to that content being more important than security. In another example, the disruption of the VPN traffic may comprise alerting a presence and destination of the VPN traffic. In some embodiments, operation 112 is performed by a processor component the same as or similar to VPN disruption component 39 (shown in FIG. 1 and described herein).

Techniques described herein may be implemented in digital electronic circuitry, or in computer hardware, firmware, software, or in combinations of them. The techniques may be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps of the techniques may be performed by one or more programmable processors executing a computer program to perform functions of the techniques by operating on input data and generating output. Method steps may also be performed by, and apparatus of the techniques may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory may be supplemented by, or incorporated in special purpose logic circuitry.

Several embodiments of the disclosure are specifically illustrated and/or described herein. However, it will be appreciated that modifications and variations are contemplated and within the purview of the appended claims.

What is claimed is:

1. A non-transitory computer-readable medium comprising instructions executable by at least one processor to effectuate:
    obtaining at least one of a plurality of default port numbers or a plurality of protocol types;
    iteratively obtaining information indicative of at least one of a predetermined host or domain name system (DNS);
    detecting virtual private network (VPN) traffic based on at least one of a port number or protocol type, wherein the VPN traffic is generated based on one or more interactions of a user, wherein the detection is performed by comparing the at least one port number or protocol type against at least one of the obtained port numbers or the obtained protocol types, and wherein the VPN traffic is detected from among a larger set of network traffic;
    determining that the at least one detected port number or protocol type indicates a higher level of security;
    filtering the larger set of traffic by identifying the detected VPN traffic routed to the at least one predetermined host or DNS; and
    disrupting the VPN traffic, wherein the disruption includes a data noise attack on one or more services utilized by the user; and
    determining the user disabled a VPN in view of the disruption.

2. The medium of claim 1, wherein the disruption is performed by not routing any of the VPN traffic through a gateway interface and by allowing other traffic therethrough.

3. The medium of claim 2, wherein the instructions further comprise:
    inserting the at least one processor into a man-in-the-middle (MitM) configuration such that an original network provider is replaced, the original network provider being an Internet service provider (ISP) or a cellular provider; and
    responsive to the determination of the disablement, releasing a device of the user from the MitM configuration such that the device returns to using the original network provider.

4. The medium of claim 1, wherein the disruption of the VPN traffic comprises alerting a presence and destination of the VPN traffic.

5. The medium of claim 4, wherein the instructions further comprise:
    generating a set of information characteristic of at least one of (i) a target device or user or (ii) an area of interest (AOI).

6. The medium of claim 1, wherein the instructions further comprise:
    determining a VPN endpoint associated with a predetermined group; and
    providing at least one indication and warning (I&W) to an operator of the at least one processor.

7. The medium of claim 1, wherein the higher level of security is based on the detected port number being shared with other hypertext transfer protocol secure (HTTPS) traffic.

8. The medium of claim 1, wherein the instructions further comprise:
    performing deep packet inspection (DPI) by analyzing all layers of an Internet protocol (IP) stack, including up to an application layer, the analysis being performed based on metadata of the application layer to identify a predetermined framing used.

9. The medium of claim 8, wherein the DPI further comprises analysis of a plurality of aspects of at least one packet of the VPN traffic to at least identify a predetermined packet length such that the VPN traffic is confirmed to be actual VPN traffic.

10. The medium of claim 1, wherein the instructions further comprise:
    detecting one or more combinations of header fields of transmission control protocol (TCP) traffic to determine a VPN provider or VPN type, the header fields indicating a window size and a permutation of accepted cypher algorithms of a VPN server.

11. The medium of claim 1, wherein the detection comprises determining that a VPN server is located in a different region of interest from the at least one processor.

12. The medium of claim 1, wherein the detection comprises determining a characteristic of the user that is different from another user in a region of interest.

13. The medium of claim 1, wherein a computer implementing the instructions of claim 1 forms part of a device consuming a size, weight, and power (SWaP) that do not satisfy criteria.

14. The medium of claim 13, wherein the device forms part of a wireless access point or a cellular tower.

15. The medium of claim 1, wherein the instructions further comprise:
    determining, from among the larger set of traffic, presence of a DNS request for the at least one predetermined host; and
    dropping the DNS request such that a client device of the user is unable to establish a connection.

16. The medium of claim 1, wherein the disruption of the VPN traffic comprises disrupting a pre-established connection by dropping the VPN traffic.

17. A computer-implemented method, the method comprising:
passively obtaining, in a network, traffic transmitted over the air (OTA);
obtaining at least one of a plurality of default port numbers or a plurality of protocol types;
iteratively obtaining current information indicative of at least one of a predetermined host or domain name system (DNS);
detecting, via a man-on-the-side (MotS) configuration, virtual private network (VPN) traffic based on at least one of a port number or protocol type, wherein the detection is performed by comparing the at least one port number or protocol type against at least one of the obtained port numbers or the obtained protocol types;
determining, from among the obtained OTA traffic, use of a transmission control protocol (TCP)-based VPN; and
sending a plurality of TCP resets on a connection or link causing (i) a reset on the connection or link of a client device and (ii) the connection or link being dropped while other traffic continues to traverse the network.

18. The method of claim 17, further comprising:
determining, from among the network traffic, presence of a DNS request for a host; and
before a DNS resolver responds to the DNS request, inserting another response that causes the client device to communicate with a different server,
wherein the VPN traffic is generated based on one or more interactions at the client device.

19. A computer-implemented method, the method comprising:
passively obtaining, in a network, traffic transmitted over the air (OTA);
obtaining at least one of a plurality of default port numbers or a plurality of protocol types;
iteratively obtaining current information indicative of at least one of a predetermined host or DNS;
detecting, via a man-on-the-side (MotS) configuration, virtual private network (VPN) traffic based on at least one of a port number or protocol type, wherein the detection is performed by comparing the at least one port number or protocol type against at least one of the obtained port numbers or the obtained protocol types;
determining, from among the obtained OTA traffic, use of a user datagram protocol (UDP)-based VPN; and
adding UDP noise comprising null data into the network such that a UDP socket is disrupted and a connection is dropped.

20. The method of claim 19, wherein the disruption comprises disrupting a connection setup by dropping VPN handshaking packets.

* * * * *